US008396044B2

(12) United States Patent
Rofougaran

(10) Patent No.: US 8,396,044 B2
(45) Date of Patent: Mar. 12, 2013

(54) METHOD AND SYSTEM FOR ANTENNA ARCHITECTURE FOR WCDMA/HSDPA/HSUDPA DIVERSITY AND ENHANCED GSM/GPRS/EDGE PERFORMANCE

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 864 days.

(21) Appl. No.: 11/536,662

(22) Filed: Sep. 29, 2006

(65) Prior Publication Data

US 2008/0080418 A1 Apr. 3, 2008

(51) Int. Cl.
*H04W 4/00* (2009.01)
*H04W 72/00* (2009.01)
*H04B 1/44* (2006.01)
*H04M 1/00* (2006.01)

(52) U.S. Cl. .......... 370/338; 370/329; 455/78; 455/450; 455/550.1

(58) Field of Classification Search ........... 370/310–350
See application file for complete search history.

(56) References Cited

U.S. PATENT DOCUMENTS

| | | | | | |
|---|---|---|---|---|---|
| 5,475,581 | A | * | 12/1995 | Lansberry | 363/41 |
| 6,487,418 | B1 | * | 11/2002 | Magana et al. | 455/464 |
| 6,594,241 | B1 | * | 7/2003 | Malmlof | 370/329 |
| 6,842,440 | B2 | * | 1/2005 | Paneth et al. | 370/330 |
| 6,937,592 | B1 | | 8/2005 | Heath | |
| 7,260,424 | B2 | | 8/2007 | Schmidt | |
| 2002/0045427 | A1 | * | 4/2002 | Lahti et al. | 455/97 |
| 2003/0054772 | A1 | * | 3/2003 | Majaniemi | 455/67.3 |
| 2003/0169706 | A1 | * | 9/2003 | Poegel et al. | 370/334 |
| 2003/0193923 | A1 | | 10/2003 | Abdelgany | |
| 2004/0131014 | A1 | * | 7/2004 | Thompson et al. | 370/230 |
| 2004/0196813 | A1 | * | 10/2004 | Ofek et al. | 370/334 |
| 2005/0176436 | A1 | * | 8/2005 | Mantravadi et al. | 455/450 |
| 2005/0180353 | A1 | * | 8/2005 | Hansen et al. | 370/328 |
| 2005/0180375 | A1 | * | 8/2005 | Batra et al. | 370/344 |
| 2005/0245202 | A1 | * | 11/2005 | Ranta et al. | 455/78 |
| 2005/0266811 | A1 | | 12/2005 | Weiss | |
| 2007/0030918 | A1 | * | 2/2007 | Kobayashi et al. | 375/267 |
| 2007/0032238 | A1 | | 2/2007 | Kim | |
| 2007/0242773 | A1 | * | 10/2007 | Li et al. | 375/299 |

FOREIGN PATENT DOCUMENTS

| | | |
|---|---|---|
| KR | 20010078104 | 8/2001 |
| KR | 20030006051 | 1/2003 |
| WO | WO 2006/029082 | 3/2006 |

\* cited by examiner

*Primary Examiner* — Temica M Beamer
*Assistant Examiner* — Andy Gu
(74) *Attorney, Agent, or Firm* — Farjami & Farjami LLP

(57) ABSTRACT

Methods and systems for antenna architecture for WCDMA/HSDPA/HSUDPA diversity and enhanced GSM/GPRS/EDGE performance are disclosed. Aspects of one method may include receiving, for example, WCDMA, HSDPA, and/or HSUDPA signals via a plurality of antennas The wireless terminal may also receive and/or transmit packets using, for example, GSM, GPRS, or EDGE, that do not require simultaneous use of multiple antennas by antenna switching among the antennas. The number of packets that may be received or transmitted before switching to another antenna may be pre-determined or may be dynamically changed. Accordingly, each antenna may receive or transmit a pre-determined number of packets or specified number of packet that may be dynamically changed before being switched to the next antenna Each of the plurality of antennas may be reconfigured to operate via at least one of a plurality of different center frequencies within a specified range when receiving or transmitting RF signals.

21 Claims, 7 Drawing Sheets

METHOD AND SYSTEM FOR ANTENNA ARCHITECTURE FOR WCDMA/HSDPA/HSUDPA DIVERSITY AND ENHANCED GSM/GPRS/EDGE PERFORMANCE

CROSS-REFERENCE TO RELATED APPLICATIONS/INCORPORATION BY REFERENCE

This application makes reference to:
U.S. application Ser. No. 11/536,678, filed on Sep. 29, 2006;
U.S. application Ser. No. 11/536,682, filed on Sep. 29, 2006;
U.S. application Ser. No. 11/536,650, filed on Sep. 29, 2006;
U.S. application Ser. No. 11/536,644, filed on Sep. 29, 2006;
U.S. application Ser. No. 11/536,676, filed on Sep. 29, 2006;
U.S. application Ser. No. 11/536,659, filed on Sep. 29, 2006;
U.S. application Ser. No. 11/536,673, filed on Sep. 29, 2006;
U.S. application Ser. No. 11/536,679, filed on Sep. 29, 2006;
U.S. application Ser. No. 11/536,670, filed on Sep. 29, 2006;
U.S. application Ser. No. 11/536,672, filed on Sep. 29, 2006;
U.S. application Ser. No. 11/536,648, filed on Sep. 29, 2006;
U.S. application Ser. No. 11/536,669, filed on Sep. 29, 2006;
U.S. application Ser. No. 11/536,666, filed on Sep. 29, 2006;
U.S. application Ser. No. 11/536,675, filed on Sep. 29, 2006;
U.S. application Ser. No. 11/536,685, filed on Sep. 29, 2006;
U.S. application Ser. No. 11/536,645, filed on Sep. 29, 2006;
U.S. application Ser. No. 11/536,655, filed on Sep. 29, 2006;
U.S. application Ser. No. 11/536,660, filed on Sep. 29, 2006;
U.S. application Ser. No. 11/536,657, filed on Sep. 29, 2006;
U.S. application Ser. No. 11/536,688, filed on Sep. 29, 2006;
U.S. application Ser. No. 11/536,667, filed on Sep. 29, 2006;
U.S. application Ser. No. 11/536,651, filed on Sep. 29, 2006;
U.S. application Ser. No. 11/536,656, filed on Sep. 29, 2006; and
U.S. application Ser. No. 11/536,663, filed on Sep. 29, 2006.

Each of the above stated applications is hereby incorporated herein by reference in its entirety.

FEDERALLY SPONSORED RESEARCH OR DEVELOPMENT

[Not Applicable]

[MICROFICHE/COPYRIGHT REFERENCE]

[Not Applicable]

FIELD OF THE INVENTION

Certain embodiments of the invention relate to wireless communication, More specifically, certain embodiments of the invention relate to a method and system for an antenna architecture for WCDMA/HSDPA/HSUDPA diversity and enhanced GSM/GPRS/EDGE performance.

BACKGROUND OF THE INVENTION

Wireless devices use one or more antennas to receive RF signals. However, signals received by an antenna may be affected by a transmission path taken by the signals, as well as by characteristics of the receive antenna. For example, the transmission path may comprise obstacles, such as, for example, buildings and/or trees that reflect and/or attenuate transmitted signals. In addition to obstacles in the transmission path, a receive antenna may also not be tuned to receive the frequencies for the desired channel For example, actual receive circuitry may deviate from the designed receive circuitry due to tolerances of real-world devices and/or manufacturing deviations. Additionally, the receive antenna may also receive interfering signals in the desired channel that may reduce the signal-to-noise ratio, thereby increasing the difficulty of demodulating the desired signal. If the interfering signals are strong enough, the receiving wireless device may not be able to properly receive and de-modulate the received signal.

Some wireless communication protocols may require use of multiple antennas for reception and transmission, where each of the multiple antennas may communicate received RF signals to separate RF front ends, and where the multiple antennas may transmit at the same time. However, simultaneous transmission via multiple antennas and simultaneous operation of a plurality of RF front ends utilizes additional power consumption that may be generally undesirable, especially if the wireless device's power source is a battery.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for an antenna architecture for WCDMA/HSDPA/HSUDPA diversity and enhanced GSM/GPRS/EDGE performance, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an antenna architecture for WCDMA/NHSDPA/HSUDPA diversity and enhanced GSM/GPRS/EDGE performance. Aspects of the method may comprise receiving RF signals having a first wireless protocol format via a plurality of antennas in a single wireless terminal operating in a first operating mode. The wireless terminal may also antenna switch among the plurality of antennas when the wireless terminal operates in a second operating mode to receive or transmit packets having a second wireless protocol format The number of packets that may be received or transmitted before switching to another antenna may be pre-determined or may be dynamically changed. Accordingly, each antenna may receive or transmit a pre-determined number of packets or specified number of packet that may be dynamically changed before being switched to the next antenna.

The wireless terminal may perform diversity processing, for example, on the received RF signals having the first wireless protocol format and on the received packets having the second wireless protocol format. Diversity processing for the received packets may comprise combining portions of a plurality of the received packets to form a single data packet The first wireless protocol may be WCDMA protocol, HSDPA protocol, and/or HSUDPA protocol, and the wireless terminal operating in the first operating mode may enable reception and/or transmission of WCODMA signals, HSDPA signals, and/or HSUDPA signals The second wireless protocol may be GSM protocol, GPRS protocol, or EDGE protocol, and the second operating mode may enable reception and/or transmission of time division multiplexed packets.

Figure 1:
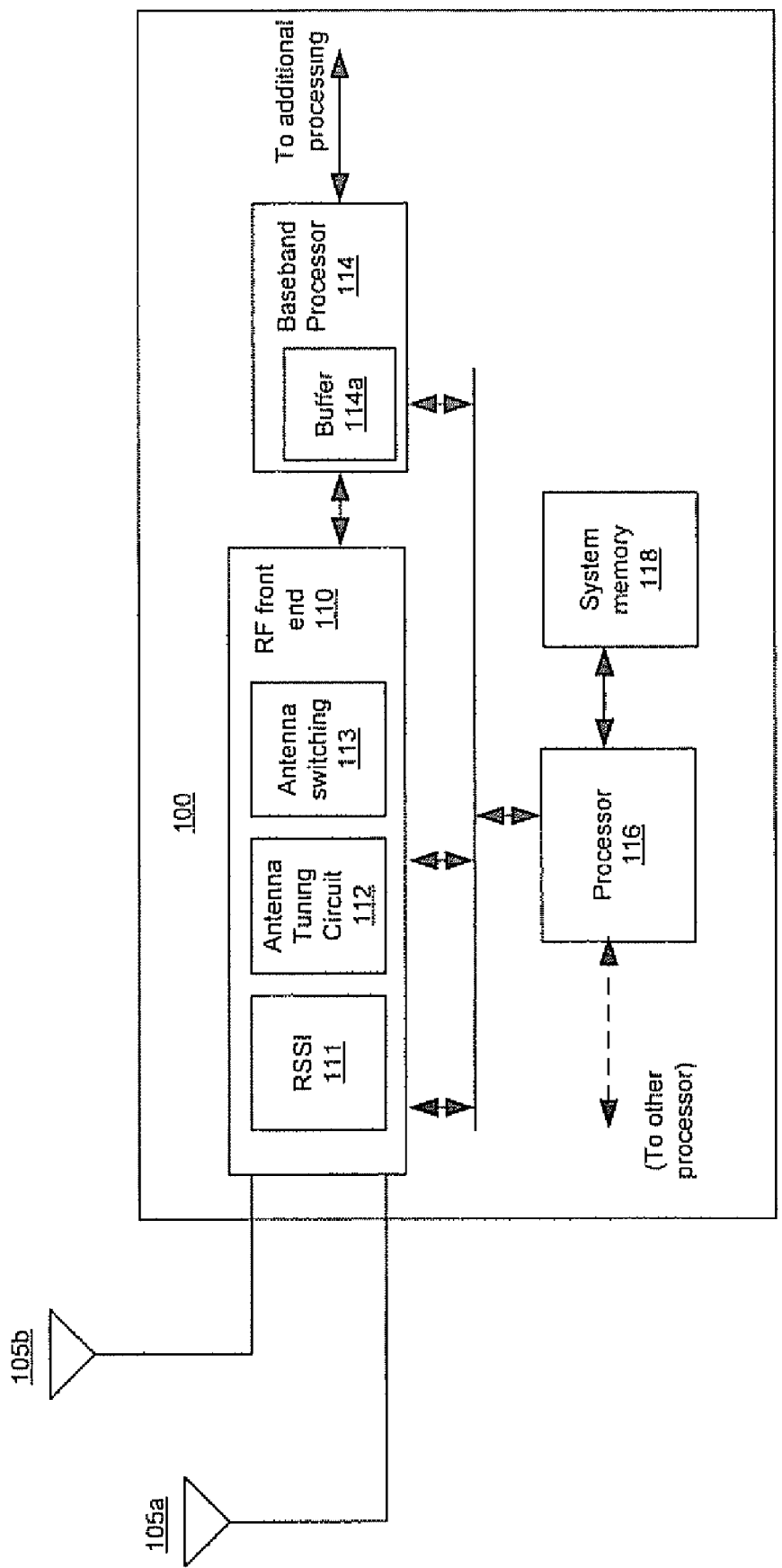
FIG. 1 is a block diagram of a wireless terminal, in accordance with an embodiment of the invention.

FIG. 1 is a block diagram of an exemplary wireless terminal, in accordance with an embodiment of the invention Referring to FIG. 1, there is shown a wireless terminal 100, which may comprise, for example, a plurality of antennas 105a ... 105b, a RF front end 110, a baseband processor 114, a processor 116, and a system memory 118. The RF front end 110 may comprise suitable logic, circuitry, and/or code that may be adapted to process received RF signals and/or RF signals to be transmitted,. The RF front end 110 may be coupled to the antenna 105 for signal reception and/or transmission. The RF front end 110 may comprise a received signal strength indicator (RSSI) circuit 111, an antenna tuning circuit block 112, and an antenna switching block 113. The RSSI circuit 111 may comprise suitable logic, circuitry, and/or code that may be adapted to enable generation of received signal strength.

The antenna tuning circuit block 112 may comprise suitable logic, circuitry, and/or code that may be adapted to adjust a center frequency for one of the antennas 105a... 105b that may be in use. An exemplary description of dynamic tuning of an antenna is disclosed in U.S. patent application Ser. No. 11/536,678, which is filed on even date herewith and is incorporated by reference in its entirety. The antenna switching block 113 may comprise suitable logic, circuitry, and/or code that may be adapted to select one of the antennas 105a... 105b for reception or transmission of RF signals.

With respect to received signals, the RF front end 110 may demodulate the received signals before further processing. Moreover, the RF front end 110 may comprise other exemplary RF processing functions, such as, filtering the received signal, amplifying the received signals, and/or downconverting the received signals to very low intermediate frequency (VLIF) signal and/or baseband signal. The RF front end 110 may comprise a IF processor which may digitize an IF signal, and digitally process the digitized IF signal to filter and/or downconvert the digitized IF signal to a digital baseband signal The IF processor may then convert the digitized baseband signal to an analog baseband signal.

The RF front end 110 may also receive digital or analog baseband signals from, for example, the baseband processor 114. For example, the baseband processor 114 may generate one ore more signals that may be communicated to the RF front end 110, which may be utilized to control one or more functions executed by the RF front end 110. Accordingly, in one embodiment of the invention, one or more signals generated by the baseband processor 114 and/or processor 116 may be utilized to program various components such as, for example, filters, phase lock loops (PLLs) or synthesizers, in the RF front end 110. The RF front end 110 may appropriately filter, amplify, and/or modulate an analog signal for transmission via the antenna 105. The RF front end 110 may also convert a digital signal to an analog signal as part of processing for transmission.

The baseband processor 114 may comprise suitable logic, circuitry, and/or code that may be adapted to process analog or digital baseband signals generated by the RF front end 110. The baseband processor 114 may also communicate baseband signals to the RF front end 110 for processing before transmission. The baseband processor 114 may also comprise a buffer 114a that may be used to store received data and/or data to be transmitted. The processor 116 may comprise suitable logic, circuitry, and/or code that may be adapted to control the operations of the RF front end 110, the antenna tuning circuit 112, the antenna switching block 113, and/or the baseband processor 114. For example, the processor 116 may be utilized to update and/or modify programmable parameters and/or values in a plurality of components, devices, and/or processing elements in the RF front end 110, the antenna tuning circuit 112, the antenna switching block 113, and/or the baseband processor 114. Exemplary programmable parameters may comprise gain of an amplifier, bandwidth of a filter, PLL parameters, and/or selection of an antenna for the antenna switching block 113. Control and/or data information may be transferred from another controller and/or processor in the wireless terminal 100 to the processor 116. Similarly, the processor 116 may transfer control and/or data information to another controller and/or processor in the wireless terminal 100.

The processor 116 may utilize the received control and/or data information to determine the mode of operation of the RF front end 110. For example, the processor 116 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 118 via the controller/processor 116. This information stored in system memory 118 may be transferred to the RF front end 110 from the system memory 118 via the controller/processor 116.

The system memory 118 may comprise suitable logic, circuitry, and/or code that may be adapted to store a plurality of control and/or data information, including parameters needed to calculate frequencies and/or gain, and/or the frequency value and/or gain value. The system memory 118 may also store, for example, various parameters for enabling and/or disabling RF processing circuitry as well as for controlling antenna hopping. The antenna hopping parameters may comprise, for example, various antenna tuning circuit parameters to determine center frequencies and bandwidths of the antenna 105, as well as impedance match the antenna 105 to the RF front end 110. An exemplary description of antenna hopping is disclosed further in U.S. patent application Ser. No. 11/536,682, which is filed on even date herewith and is incorporated by reference in its entirety.

The wireless terminal 100 may support wireless protocols that require multiple antennas for reception and transmission, such as, for example, WCDMA, HSDPA, and/or HSUDPA. Accordingly, the RF front end 110 may comprise separate RF processing circuitry for processing RF signals received via, for example, the antennas 105a ... 105b, and for processing signals to be transmitted via the antennas 105a ... 105b. The RF processing circuitry may, for example, amplify, filter, modulate, and/or demodulate analog signals The RF processing circuitry may also, for example, upconvert and/or downconvert between RF frequencies, IF frequencies, and baseband frequencies.

Since the wireless terminal 100 may also support wireless protocols that do not require multiple antennas for transmission and/or reception, such as, for example, GSM, GPRS, EDGE, and IEEE 802.11, an embodiment of the invention may disable unneeded RF circuitry for RF signals. For example, if antenna switching is used to receive RF signals via one antenna at a time instant, or to transmit RF signals via one antenna at a time instant, then only one RF processing circuitry may need to be enabled. An exemplary description of antenna switching is disclosed in U.S. patent application Ser. No. 11/536,666, which is filed on even date herewith and is incorporated by reference in its entirety.

The enabling and disabling of the RF circuitry may be controlled, for example, by the baseband processor 114 and/or the processor 116. For example, a user of the wireless terminal 100 may select from a plurality of wireless service providers where one wireless service provider may provide WCDMA, HSDPA, and/or HSUDPA service, for example, and another wireless service provider may provide GSM service. Accordingly, when the user selects, for example, WCDMA service, the processor 116 may provide an indication to the RF front end 110 to enable separate RF processing circuitry for each of the antennas 105a ... 105b. If the wireless terminal 100 user selects GSM service, for example, the processor 116 may provide an indication to the RF front end 110 to leave one RF processing circuitry enabled, while disabling the other RF processing circuitry. This may occur because RF signals may be received or transmitted via one antenna at a time.

In operation, RF signals may be received and transmitted by the wireless terminal 100 via the antenna 105a ... 105b. In instances where the wireless terminal 100 may be receiving WCDMA signals, the WCDMA signals may be received by the plurality of antennas 105a ... 105b. Similarly, in instances where the wireless terminal 100 may be transmitting WCDMA signals, the WCDMA signals may be transmitted by the plurality of antennas 105a ... 105b. The RF signals to, or from, the antennas 105a ... 105b may be processed by separate RF processing circuitry.

However, in instances where the wireless terminal 100 may be transmitting or receiving, for example, GSM signals, the wireless terminal 100 may receive digital data, such as, for example, packets, via the antennas 105a ... 105b by switching antennas such that at any given time, one of the antennas 105a ... 105b may provide received packets to the RF front end 110. When the wireless terminal 100 may be transmitting, the baseband processor 114 may communicate a packet to the RF front end 110 Accordingly, the RF front end 110 may communicate a packet to the presently switched antenna. Since there may be a single stream of RF signals to or from the antennas 105a ... 105b, multiple RF processing circuitry may not be needed. Accordingly, one RF processing circuitry may be enabled, and other RF processing circuitry may be disabled After the baseband processor 114 communicates the packet to the RF front end 110, the baseband processor 114 may configure the antenna switching block 113 to switch to another antenna. Accordingly, each antenna pay transmit a packet at a time. In other exemplary embodiments of the invention, each antenna may transmit another specified number of packets before switching to another antenna.

The number of packets to be received by an antenna may be different for each antenna. For example, if the antenna 105a has a higher signal-to-noise ratio (SNR), or a higher RSSI, than the antenna 105b, the antenna 105a may receive more packets than the antenna 105a before switching to the other antenna. The number of packets to be received by an antenna before switching to another antenna may also depend on a bit error rate (BER) for data received from that antenna. For example, if the baseband processor determines that the BER for packets received from the antenna 105a is lower than the BER for packets received from the antenna 105b, more packets may be received from the antenna 105a than from the antenna 105b before switching to the other antenna. Accordingly, the number of packets to be received by an antenna before switching to another antenna may be determined or dynamically changed.

The antenna tuning circuit 112 may present an impedance to the antenna 105, and accordingly, the antenna 105 in conjunction with the antenna tuning circuit 112 may have a center frequency and a bandwidth about the center frequency. The antenna tuning circuit 112 may also impedance match the antenna 105 to the RF front end 110. Accordingly, the antenna 105 may present optimal reception for those signals within the bandwidth.

However, various environmental conditions may cause the center frequency to drift from the desired center frequency. For example, if the wireless terminal 100 is a mobile terminal, the inductive or capacitive characteristics of a user's hand holding the mobile terminal may change the center frequency The wireless terminal 100 may detect the center frequency drift and may dynamically configure the antenna tuning circuit block 112 in order to bring the center frequency closer to a desired center frequency. The RF front end 110, which may receive weak signals at the desired frequencies, may be enabled to detect the center frequency drift, for example. The center frequency drift may also be detected, for example, by processing the received signals. For example, the baseband processor 114 may detect an increase in bit error rate of the received packets, which may be indicative of center frequency drift The signal strength indication and/or bit error rate may be communicated to the processor 116, and the processor 116 may determine that the antenna tuning circuit block 112 may need to be reconfigured. Accordingly, the processor 116 may communicate appropriate control and/or data to the antenna tuning circuit block 112 to reconfigure and/or retune the antenna tuning circuit block 112. By processing information regarding the received signals, the processor 116 may dynamically adjust the center frequency in order to reduce the effects of center frequency drift The processor 116 may also reconfigure the antenna tuning circuit block 112 to adjust the bandwidth of the antenna 105 and/or impedance matching of the antenna 105 and the RF front end 110

While FIG. 1 may have been described as communicating to at least one other processor or controller, the invention need not be so limited. Accordingly, there may be instances when the processor 116 may not have to communicate with other processors in controlling RF communications. For example, a design of the wireless terminal may not utilize other processors than the processor 116 or the processor 116 may have access to all information needed to control RF communications Additionally, the RSSI circuit 111 may have been shown as part of the RF front end 110. The invention need not be so limited. For example, the RSSI circuit 111 may be before the RF front end 110, part of the RF front end 110, and/or after the RF front end 110.

Figure 2A:
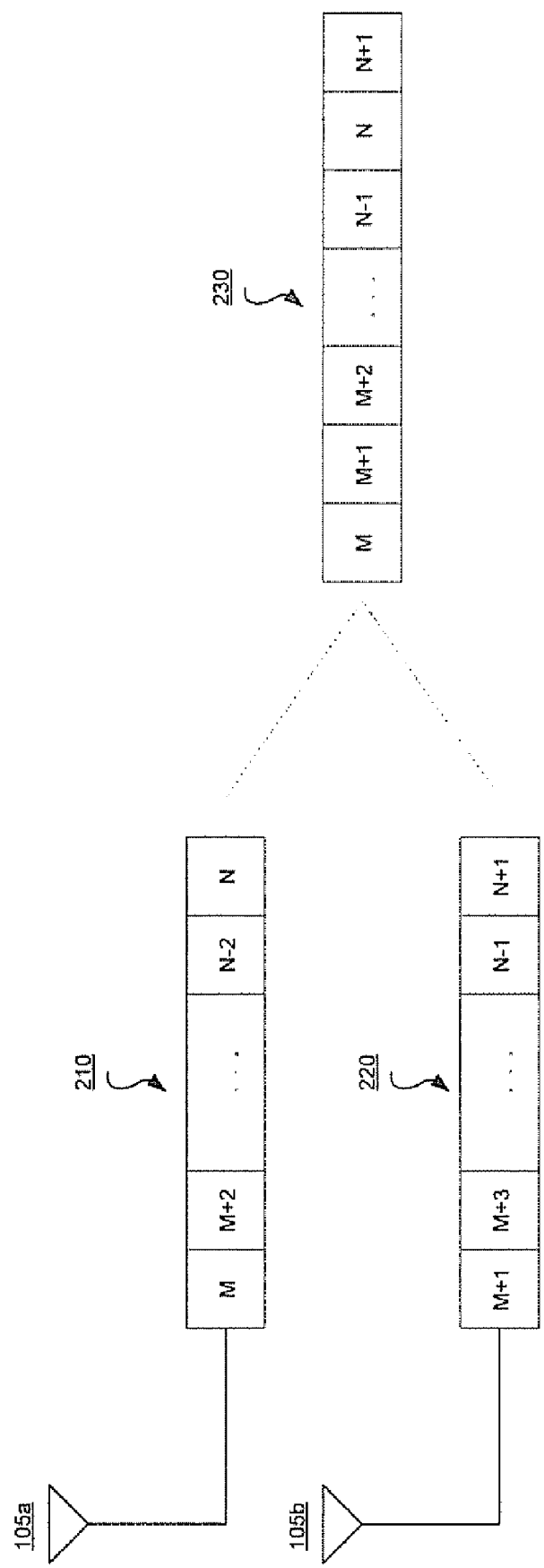
FIG. 2A is a diagram illustrating exemplary antenna switching, in accordance with an embodiment of the invention.

FIG. 2A is a diagram illustrating exemplary antenna switching, in accordance with an embodiment of the invention. Referring to FIG. 2A, there is shown the antennas 105a and 105b, packet streams 210 and 220, and combined packet stream 230. The packet stream 210 may be received by, for example, the antenna 105a and the packet stream 220 may be received by, for example, the antenna 105b. For example, the antenna switching block 113 may be configured to select input from the antenna 105a, and therefore may receive packet M. After receiving the packet M, the antenna switching block 113 may be configured by, for example, the baseband processor 114 or the processor 116 to receive input from the antenna 105b. Accordingly, packet M+1 may be received from the antenna 105b. The antenna switching block may then be configured to receive the next packet, for example, packet M+2, from the antenna 105a.

By receiving alternating packets from the antenna 105a and 105b, the packet stream 210 may comprise packets M, M+2. N–2, and N, and the packet stream 220 may comprise packets M+1, M+3 ... N–1, and N+1. The packets received may be stored, for example, in the buffer 114a or the system memory 118. The packets from the packet streams 210 and 220 may be stored in order to form the packet stream 230. Accordingly, the packet stream 230 may comprise the packets M, M+1, M+2, M+3, ..., N–2, N–1, N, and N+1. The packets in the packet stream 230 may be processed by, for example, the baseband processor 114 and/or the processor 116 to retrieve baseband information.

Figure 2B:
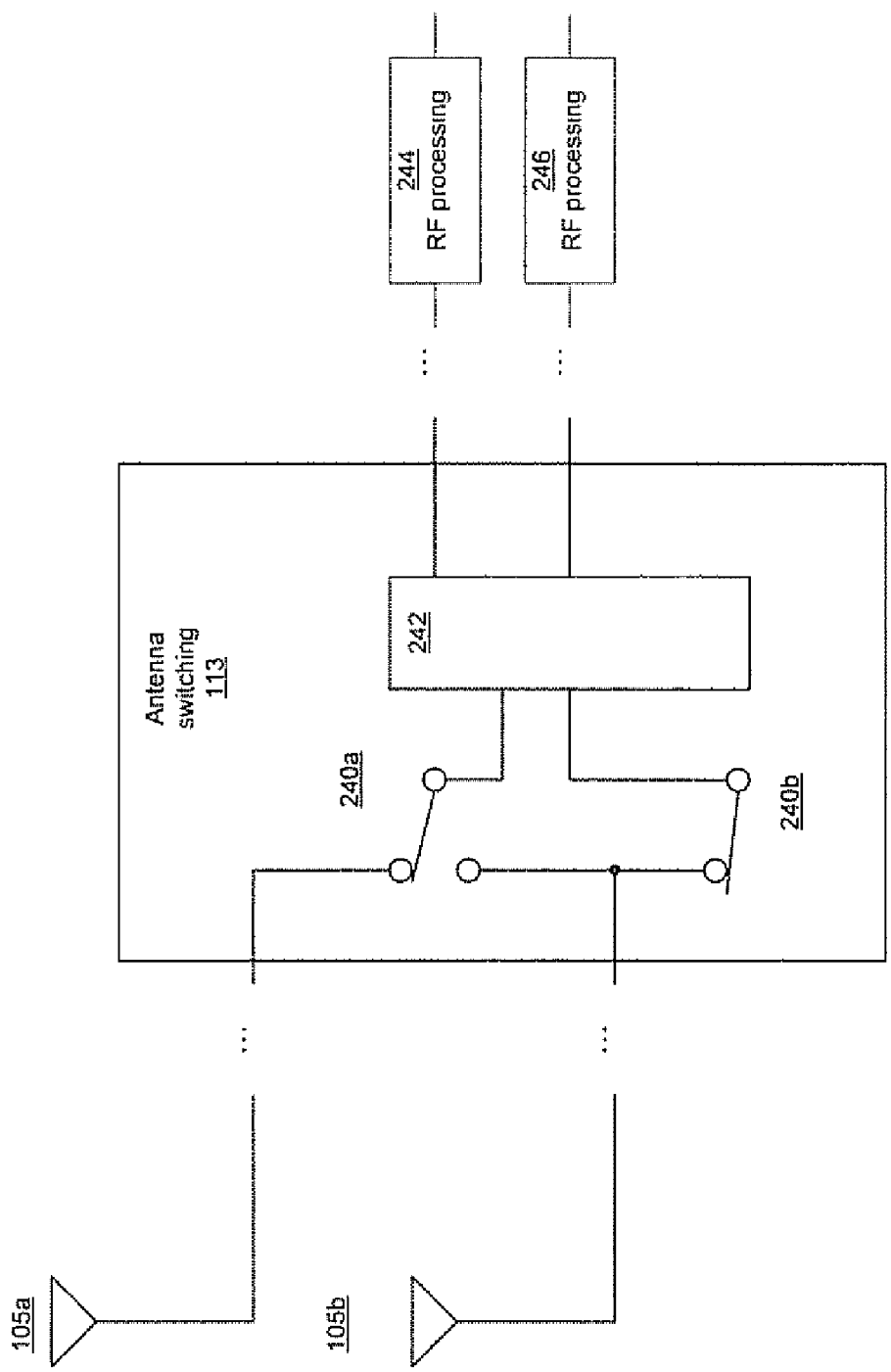
FIG. 2B is a block diagram illustrating exemplary antenna switching, in accordance with an embodiment of the invention

Similarly, when transmitting data, packets from the combined packet stream 230 may be communicated to the RF front end 110, where the packet may be communicated to one of the antennas 105a ... 105b. Accordingly, if the packets are transmitted via the antennas 105a and 105b, the antenna 105a may transmit the packet stream 210 and the antenna 105b may transmit the packet stream 220. The baseband processor 114 may antenna switch, for example, after communicating one packet to the RF front end 110 or after receiving a packet However, the invention need not be so limited. For example, antenna switching may occur after a plurality of packets FIG. 2B is a block diagram illustrating exemplary antenna switching, in accordance with an embodiment of the invention Referring to FIG. 2B, there is shown the antennas 105a and 105b, the antenna switching block 113, and RF processing circuitry 244 and 246. The antenna switching block 113 may comprise switches 240a and 240b, and a diplexer 242. The switch 240a may comprise suitable logic, circuitry, and/or code that may enable communication of RF signals between the RF processing circuitry 244 and either the antenna 105a or the antenna 105b when antenna switching occurs if, for example, the wireless terminal 100 is using in GSM wireless service. If, for example, the wireless terminal 100 is using WCDMA wireless service, the switch 240a may communicate RF signals between the antenna 105a and the RF processing circuitry 244.

The switch 240b may comprise suitable logic, circuitry, and/or code that may enable communication of RF signals between the RF processing circuitry 246 and the antenna 105b if, for example, the wireless terminal 100 is using WCDMA wireless service. In instances where the wireless terminal 100 may be using, for example, GSM service, the switch 240b may be open so as not to communicate signals between the antenna 105b and the RF processing circuitry 246. The switches 240a and 240b may be configured by signals from, for example, the baseband processor 114 and/or the processor 116.

The diplexer 242 may comprise suitable logic, circuitry, and/or code that may enable, for example, isolating a receive portion of the RF processing circuitry 244 from a transmit portion of the RF processing circuitry 244. The diplexer 242 may couple the RF processing circuitry 244 to the switch 240a. The diplexer 242 may also isolate, for example, a receive portion of the RF processing circuitry 246 from a transmit portion of the RE processing circuitry 246. The diplexer 242 may couple the RF processing circuitry 246 to the switch 240b. The diplexer 242 may further isolate the RF processing circuitry 244 from the RF processing circuitry 246.

Accordingly, the receive portion of the RF processing circuitry 244 may be protected from damage by the high power signals from the transmit portions of the RF processing circuitry 244 and the RF processing circuitry 246. Similarly, the receive portion of the RF processing circuitry 246 may be protected from damage by the high power signals from the transmit portions of the RF processing circuitry 244 and the RF processing circuitry 246. The receive portions of the RF processing circuitry 244 and the RF processing circuitry 246 may also be isolated from noise that may be generated by the transmit portions of the RF processing circuitry 244 and/or the RF processing circuitry 246.

Figure 3:
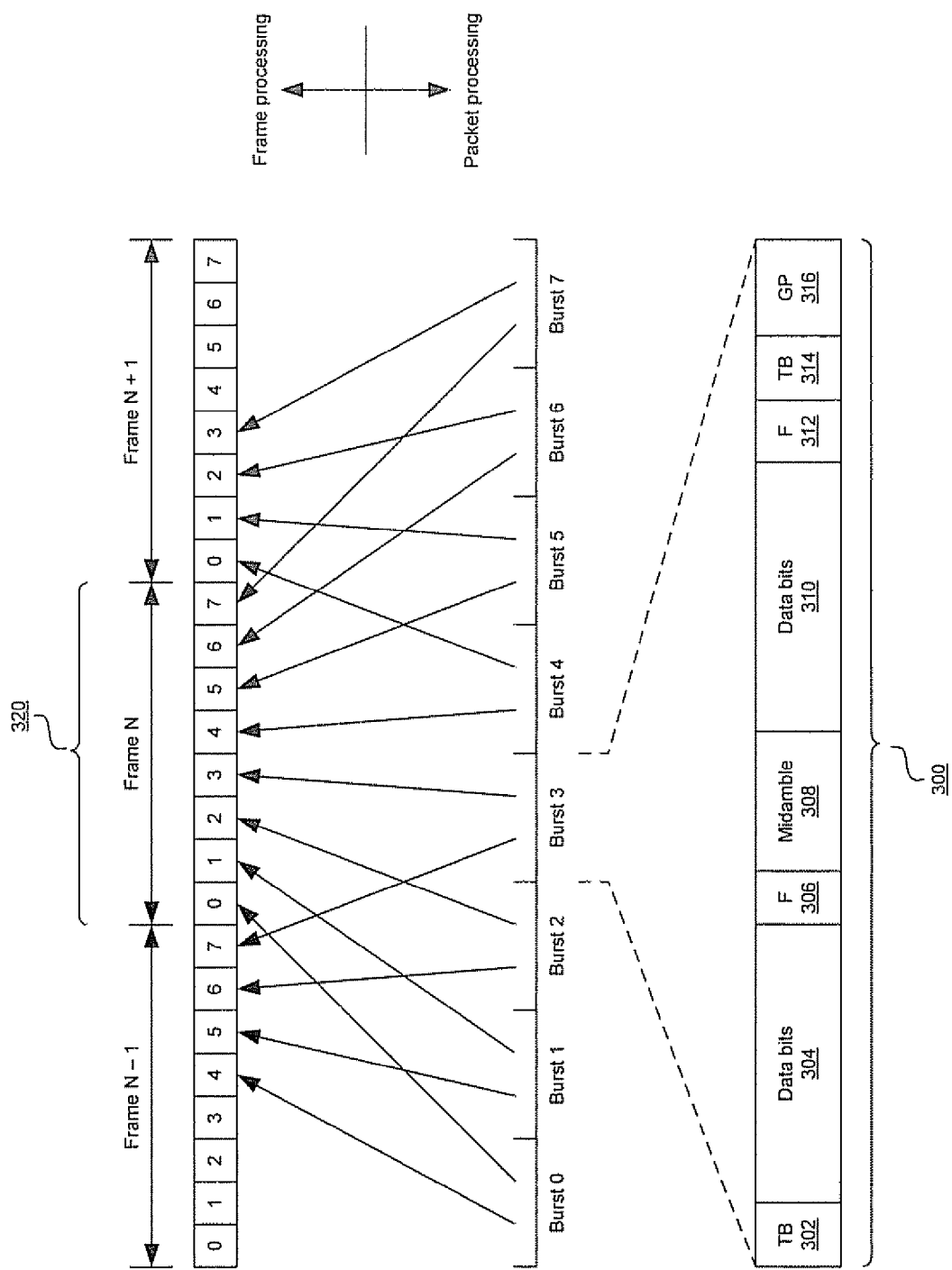
FIG. 3 is a diagram illustrating exemplary diversity processing, in accordance with an embodiment of the invention.

While the antenna switch block 113 may have been illustrated for a 2-antenna system, the invention need not be so limited For example, the number of antennas used for a wireless terminal 100 may be design dependent FIG. 3 is a diagram illustrating exemplary diversity processing, in accordance with an embodiment of the invention. Referring to FIG. 3, there is shown a series of at least one packet 300 and a series of at least one frame 320. The series of at least one packet 300, as shown, may correspond to Packet 0 through Packet 7, while the series of at least one frame 320, as shown, may correspond to Frame N–1 through Frame N+1 The packet 300 may comprise a tail bit (TB) 302, first data bits 304, a flag bit (F) 306, a midamble 308, second data bits 310, a flag bit (F) 312, a tail bit (TB) 314, and guard bits (GP) 316. The TB 302 and the TB 314 may comprise 3 bits each. The first data bits 304 and the second data bits 310 may comprise 57 bits each. The F 306 and the F 312 flag bits may comprise 1 bit each The midamble 308 may comprise 26 bits and may be utilized as a training sequence for channel equalization, for example. The frame 320 may comprise eight partitions or sequences of bits.

As shown, the first data bits 304 in the Packet 0 through Packet 3 may be transferred to the fifth, sixth, seventh, and eight sequences of the Frame N–1 respectively, for example The first data bits 304 in the Packet 4 through Packet 7 may be transferred to the fifth, sixth, seventh, and eight sequences of the Frame N respectively, for example. The second data bits 310 in the Packet 0 through Packet 3 may be transferred to the first, second, third, and fourth sequences of the Frame N respectively, for example. The second data bits 310 in the Packet 4 through Packet 7 may be transferred to the first, second, third, and fourth sequences of the Frame N+1 respectively, for example. The diversity processing of bit sequences transferred from the packets to the frames may be performed by utilizing, for example, Viterbi algorithm and/or minimum mean square error (MMSE) algorithm to reduce the number of sequences utilized during the decoding search.

Figure 4:
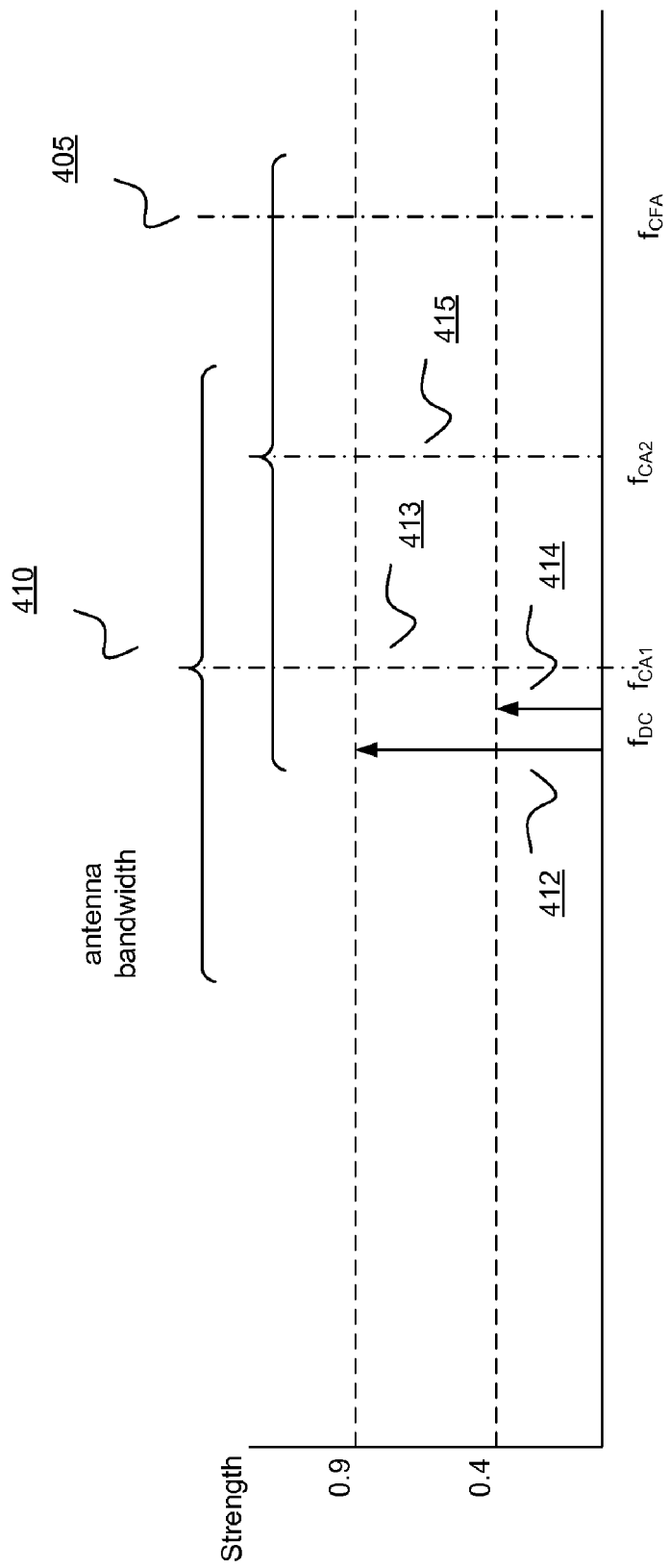
FIG. 4 is a chart illustrating exemplary signal strengths for a channel as a center frequency is changed due to antenna hopping, in accordance with an embodiment of the invention

FIG. 4 is a chart illustrating exemplary signal strengths for a channel as a center frequency is changed due to antenna hopping, in accordance with an embodiment of the invention. Referring to FIG. 4, there is shown a chart where the horizontal axis indicates frequency and the vertical axis indicates signal strength. If there is a frequency offset between the desired channel and the center frequency of, for example, the antenna 105a, the wireless terminal 100 may not be able to determine the frequency offset. Accordingly, in an embodiment of the invention, after switching to an antenna, for example, the antenna 105a, the wireless terminal 100 may antenna hop by tuning the antenna 105a to change the center frequency of the antenna 105a to various frequencies.

For example, the desired channel frequency, and the desired center frequency, may be at the frequency $f_{DC}$ while the actual center frequency may have drifted to, for example, actual center frequency 405 of $f_{CFA}$. While the wireless terminal 100 may have no indication that the actual center frequency 405 is a different frequency than the desired center frequency, an antenna hopping algorithm may still be applied. Accordingly, signals for the desired channel may be received for various center frequencies. For example, the first antenna hop may configure the antenna tuning circuit 112 to a center frequency 413 at the frequency $f_{CFA1}$. Since the center frequency 413 may be close to the desired channel frequency $f_{DC}$, the signal strength 412 for the desired channel for the center frequency $f_{CA1}$ may be a normalized value of 0.9.

The next antenna hop may configure the antenna tuning circuit 112 to a center frequency 415 at the frequency $f_{CA2}$. Since the center frequency 415 may be farther away from the desired channel frequency $f_{DC}$ than the center frequency 413 may be from the desired channel frequency $f_{DC}$, the signal strength 414 for the desired channel for the center frequency $f_{CFA2}$ may be at a smaller normalized value of 0.4. Antenna hops may be configured so that adjacent antenna bandwidths may overlap. For example, the antenna bandwidth associated with the center frequency 413 may overlap a portion of the antenna bandwidth associated with the center frequency 415.

In this manner, the wireless terminal 100 may be able to receive signals for the desired channel from different center frequencies associated with the antenna 105a at various times. Accordingly, the wireless terminal 100 may be able to compensate for center frequency drift without knowing the specific amount of drift.

Figure 5:
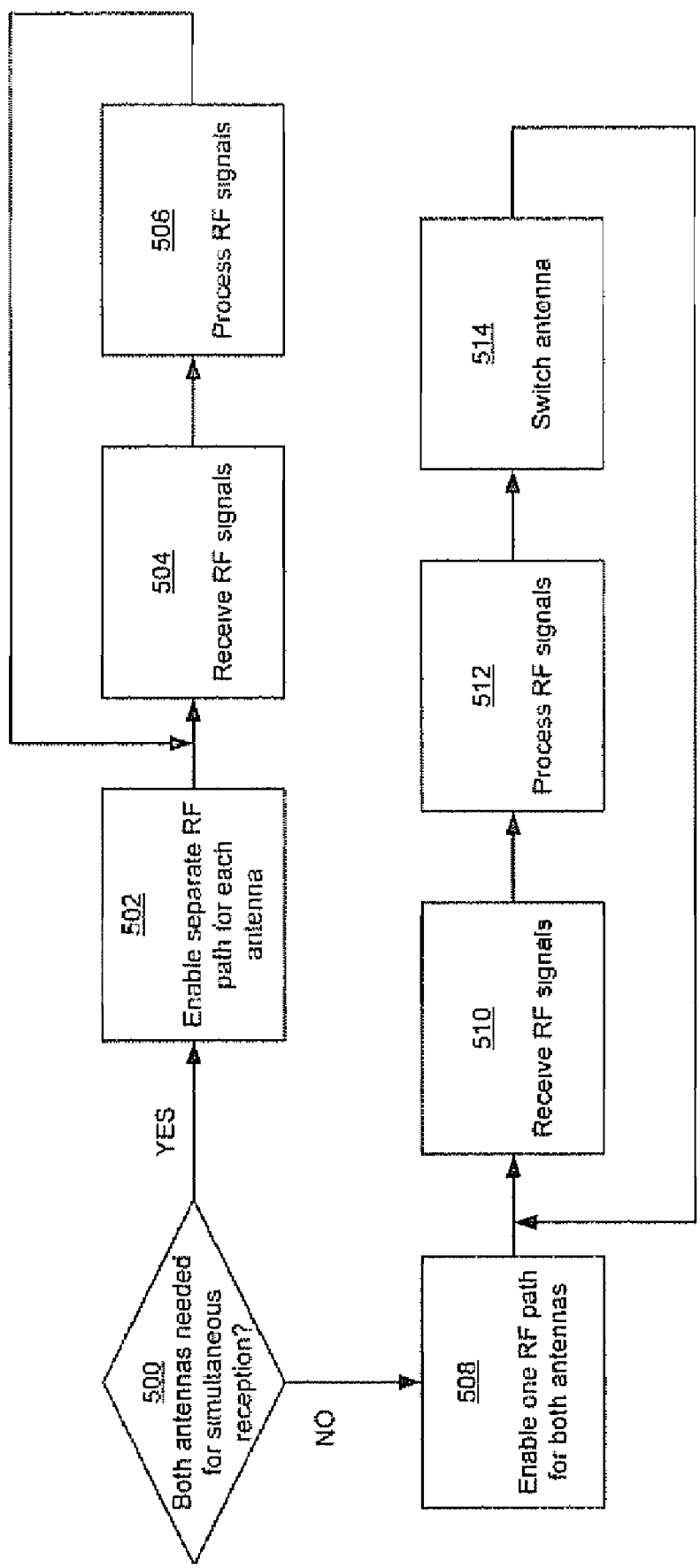
FIG. 5 is a flow diagram illustrating exemplary steps for receiving data using antenna switching, in accordance with an embodiment of the invention.

FIG. 5 is a flow diagram of exemplary steps for receiving data using antenna switching, in accordance with an embodiment of the invention. Referring to FIG. 5, there is shown steps 500 to 514. In step 500, a determination may be made as to whether the antennas 105a and 105b may simultaneously communicate received RF signals for processing by the wireless terminal 100. For example, if a user of the wireless terminal 100 selects WCDMA wireless service, both antennas 105a and 105b may be used to receive RF signals. The RF signals from the antennas 105a and 105b may be communicated to separate RF processing circuitry, such as, for example, the RF processing circuitry 244 and 246. If the wireless terminal 100 user selects GSM wireless service, for example, the antennas 105a and 105b may not need to communicate RF signals to the RF processing blocks 244 and 246 simultaneously Accordingly, antenna switching between the antennas 105a and 105b may result in alternately communicating received RF signals to a single RF processing circuitry, for example, the RE processing circuitry 244. In instances where simultaneous reception for antennas 105a and 105b may be needed, the next step may be step 502. Otherwise, the next step may be step 508.

In step 502, the processor 116, for example, may communicate signals to enable both RF processing circuitry 244 and 246. The processor 116, for example, may also communicate to the antenna switching block 113 to enable communication of signals between the antenna 105a and the RF processing circuitry 244, and between the antenna 105b and the RF processing circuitry 246. In step 504, the antennas 105a and 105b may receive RF signals and appropriately communicate the received RF signals to the RF processing circuitry 244 and 246, respectively. In step 506, the RF signals may be processed by the RF processing circuitry 244 and 246. The processed signals from the RF processing circuitry 244 and 246 may be communicated to the baseband processor 114 for further processing. The next step may be step 504.

In step 508, unneeded RF processing circuitry may be disabled. For example, the processor 116 may communicate with the antenna switching block 113 to disable the RF processing circuitry 246 while enabling the RF processing circuitry 244. The processor 116 may also communicate with the antenna switching block 113 to open the switch 240b, while configuring the switch 240a to couple, for example, the antenna 105a to the RF processing circuitry 244. In step 510, the antenna currently coupled to the RF processing circuitry 244 may communicate received RF signals to the RF processing circuitry 244

In step 512, the RF processing circuitry 244 may process the RF signals from an antenna The processed signals from the RF processing circuitry 244 may be communicated to the baseband processor 114 for further processing. In step 514, the processor 116, for example, may communicate to the switch 240a to switch to the other antenna. Accordingly, if the current antenna communicating RF signals to the RF processing circuitry 244 is the antenna 105a, the switch 240a may couple the antenna 105b to the RF processing circuitry 244. The next step may be step 510.

Figure 6:
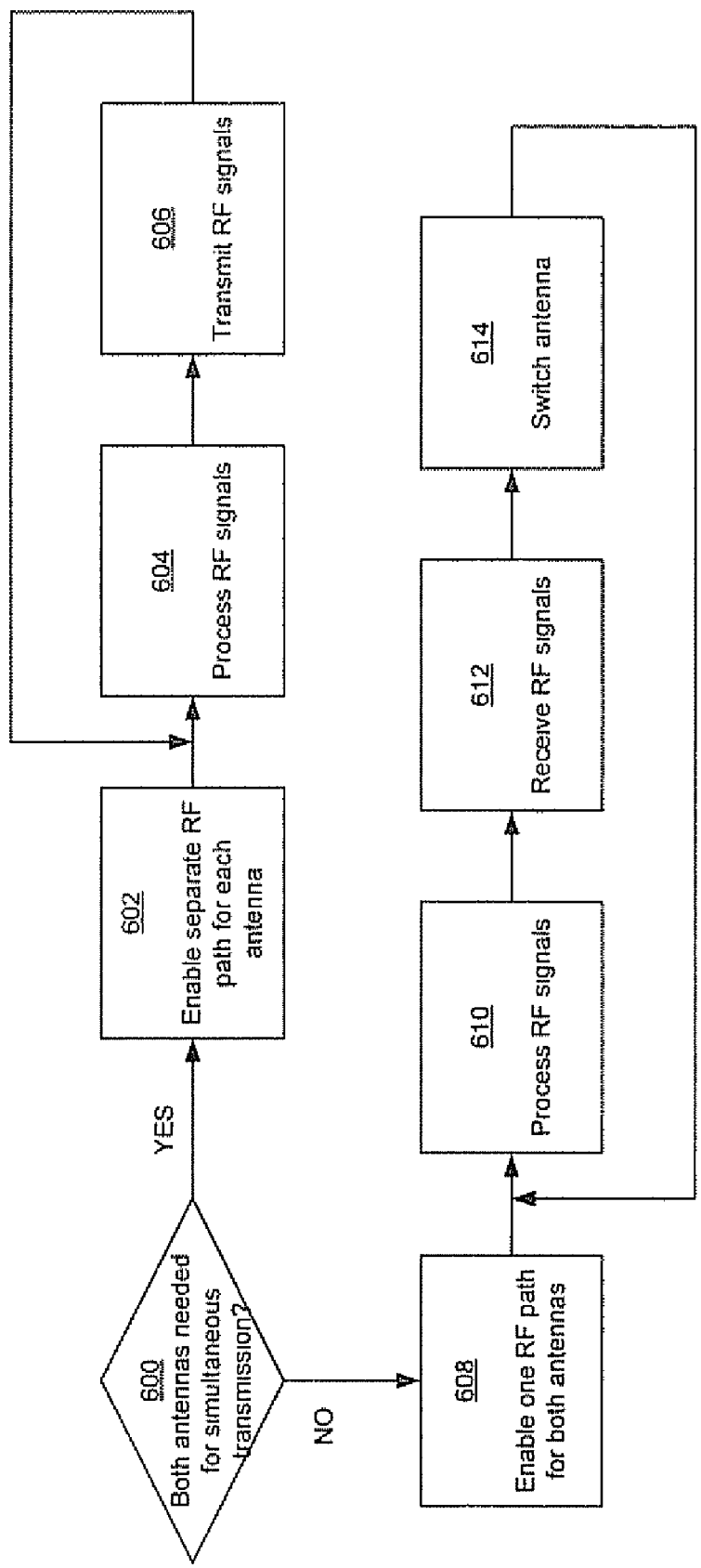
FIG. 6 is a flow diagram illustrating exemplary steps for transmitting data using antenna switching, in accordance with an embodiment of the invention.

FIG. 6 is a flow diagram illustrating exemplary steps for transmitting data using antenna switching, in accordance with an embodiment of the invention. Referring to FIG. 6, there is shown steps there is shown steps 600 to 614. In step 600, a determination may be made as to whether the antennas 105a and 105b may simultaneously transmit RF signals. For example, if a user of the wireless terminal 100 selects WCDMA wireless service, both antennas 105a and 105b may be used to transmit RF signals. If the wireless terminal 100 user selects GSM wireless service, for example, the antennas 105a and 105b may not need to transmit RF signals simultaneously. Accordingly, antenna switching between the antennas 105a and 105b may result in alternately transmitting RF signals from the antennas 105a and 105b. If simultaneous transmission by the antennas 105a and 105b is needed, the next step may be step 602. Otherwise, the next step may be step 608.

In step 602, the processor 116, for example, may communicate signals to enable both RF processing circuitry 244 and 246. The processor 116, for example, may also communicate to the antenna switching block 113 to enable communication of signals between the RF processing circuitry 244 and the antenna 105a, and between the RF processing circuitry 246 and the antenna 105b. In step 604, the signals to be transmitted may be processed by the baseband processor 114, and then further processed by the RF processing circuitry 244 and 246. In step 606, the antennas 105a and 105b may receive RF signals from the RF processing circuitry 244 and 246, respectively, and may transmit the RF signals. The next step may be step 604.

In step 608, unneeded RF processing circuitry may be disabled. For example, the processor 116 may communicate with the antenna switching block 113 to disable the RF processing circuitry 246 while enabling the RF processing circuitry 244. The processor 116 may also communicate with the antenna switching block 113 to open the switch 240b, while configuring the switch 240a to couple, for example, the antenna 105a to the RF processing circuitry 244.

In step 610, the RE processing circuitry 244 may process the baseband signals from the baseband processor 114. The RF processing circuitry 244 may appropriately filter, amplify, modulate, and upconvert the baseband signals from the baseband processor 114 to RF signals. In step 612, the RF signals may be communicated to the antenna 105*a*, and the may be transmitted via the antenna 105*a*. In step 614, the processor 116, for example, may communicate to the switch 240*a* to switch to the other antenna. Accordingly, if the current antenna transmitting RF signals is the antenna 105*a*, the switch 240*a* may couple the antenna 105*b* to the RF processing circuitry 244. The next step may be step 610.

In accordance with an embodiment of the invention, aspects of an exemplary system may comprise the antennas 105*a* . . . 105*b* in the wireless terminal 100 operating in a first operating mode to receive or transmit RE signals in a first wireless protocol format. The wireless terminal 100 may also operate in a second operating mode to receive or transmit packets in a second wireless protocol format by switching among the plurality of antennas. The baseband processor 114 in the wireless terminal 100 may perform diversity processing for the received RF signals and the received packets. The first wireless protocol may be, for example, WCDMA protocol, HSDPA protocol, and/or HSUDPA protocol, and the wireless terminal 100 operating in the first operating mode may receive WCDMA signals, HSDPA signals, and/or HSUDPA signals. The second wireless protocol may be, for example, GSM, GPRS, or EDGE protocol. The second operating mode may receive, for example, time division multiplexed packets.

The wireless terminal 100 may reconfigure each of the antennas 105*a* . . . 105*b* via the antenna tuning circuit block 112, to operate via at least one of a plurality of different center frequencies within a specified range when receiving RF transmission. The antenna tuning may occur for in the first operating mode and/or in the second operating mode. The wireless terminal 100 may antenna switch after receiving or transmitting a determined number of packets The number of packets may be pre-determined or dynamically determined by, for example, the processor 116 based on, for example, throughput, RSSI, SNR, and/or BER. The diversity processing may, for example, comprise processing a plurality of received packets to retrieve information for a single destination packet.

Another embodiment of the invention may provide a machine-readable storage, having stored thereon, a computer program having at least one code section executable by a machine, thereby causing the machine to perform the steps as described above for antenna architecture for WCDMA/HSDPA/HSUDPA diversity and enhanced GSM/GPRS/EDGE performance. Furthermore, while embodiments of the present invention may have included some wireless communication protocols, such as WCDMA/HSDPA/HSUDPA, that may require multiple antennas for transmission and/or reception, the invention need not be so limited. Various embodiments of the invention may be used for other wireless communication protocols that may also require multiple antennas.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following; a) conversion to another language, code or notation; b) reproduction in a different material form.

While the present invention has been described with reference to certain embodiments, it will be understood by those skilled in the art that various changes may be made and equivalents may be substituted without departing from the scope of the present invention In addition, many modifications may be made to adapt a particular situation or material to the teachings of the present invention without departing from its scope. Therefore, it is intended that the present invention not be limited to the particular embodiment disclosed, but that the present invention will comprise all embodiments failing within the scope of the appended claims.

What is claimed is:

1. A method for wireless communication, the method comprising:
  configuring, during operation of a wireless terminal, a mode of operation of said wireless terminal based on which one of a plurality of wireless protocols are associated with RF signals to be received by said wireless terminal, wherein said wireless terminal comprises two radio frequency (RF) processing circuits;
  when operating in a first operating mode: enabling the two RF processing circuits, receiving said RF signals having a first wireless protocol format via a plurality of antennas simultaneously, and performing diversity processing for said received RF signals having said first wireless protocol format; and
  when operating in a second operating mode: enabling only one of the two RF processing circuits, receiving said RF signals having a second wireless protocol format via said plurality of antennas by selecting an antenna and repeatedly switching between or among said plurality of antennas, cycling the selected antenna through a plurality of configurations, wherein each configurations is associated with a different center frequency within a specified range, and performing diversity processing for said received RF signals having said second wireless protocol format.

2. The method according to claim 1, wherein said first wireless protocol is at least one of the following: WCDMA protocol, HSDPA protocol, and HSUDPA protocol, and said wireless terminal operating in said first operating mode receives at least one of the following: WCDMA transmission, HSDPA transmission, and HSUDPA transmission.

3. The method according to claim 1, wherein said second wireless protocol is at least one of the following: GSM protocol, GPRS protocol, and EDGE protocol.

4. The method according to claim 1, wherein said wireless terminal receives time division multiplexed packets when operating in said second operating mode.

5. The method according to claim 1, comprising, while operating in said second operating mode, switching from one of said plurality of antennas to another of said plurality of antennas after receiving a determined number of packets.

6. The method according to claim 1, wherein said diversity processing comprises processing a plurality of received packets to retrieve information for a single destination packet.

7. The method according to claim 1, comprising, while operating in said second operating mode, switching between or among said plurality of antennas in said wireless terminal to transmit RF signals having said second wireless protocol format.

8. A non-transitory machine-readable storage having stored thereon, a computer program having at least one code section for wireless communication, the at least one code section being executable by a machine for causing the machine to perform steps comprising:
configuring, during operation of a wireless terminal, a mode of operation of said wireless terminal based on which one of a plurality of wireless protocols are associated with RF signals to be received by said wireless terminal, wherein said wireless terminal comprises two radio frequency (RF) processing circuits;
when operating in a first operating mode: enabling the two RF processing circuits, receiving said RF signals having a first wireless protocol format via a plurality of antennas simultaneously, and performing diversity processing for said received RF signals having said first wireless protocol format; and
when operating in a second operating mode: enabling only one of the two RF processing circuits, receiving said RF signals having a second wireless protocol format via said plurality of antennas by selecting an antenna and repeatedly switching between or among said plurality of antennas, cycling the selected antenna through a plurality of configurations, wherein each configurations is associated with a different center frequency within a specified range, and performing diversity processing for said received RF signals having said second wireless protocol format.

9. The non-transitory machine-readable storage according to claim 8, wherein said first wireless protocol is at least one of the following:
WCDMA protocol, HSDPA protocol, and HSUDPA protocol, and said wireless terminal operating in said first operating mode receives at least one of the following: WCDMA transmission, HSDPA transmission, and HSUDPA transmission.

10. The non-transitory machine-readable storage according to claim 8, wherein said second wireless protocol is at least one of the following: GSM protocol, GPRS protocol, and EDGE protocol.

11. The non-transitory machine-readable storage according to claim 8, wherein said wireless terminal receives time division multiplexed packets when operating in said second operating mode.

12. The non-transitory machine-readable storage according to claim 8, wherein said at least one code section comprises code for, while operating in said second operating mode, switching from one of said plurality of antennas switching to another of said plurality of antennas after receiving a determined number of packets.

13. The non-transitory machine-readable storage according to claim 8, wherein said diversity processing comprises processing a plurality of received packets to retrieve information for a single destination packet.

14. The non-transitory machine-readable storage according to claim 8, wherein said at least one code section comprises code for, while operating in said second operating mode, switching between or among said plurality of antennas in said wireless terminal to transmit RF signals having said second wireless protocol format.

15. A system for wireless communication, the system comprising:
one or more circuits for use in a single wireless terminal, wherein said one or more circuits comprise two radio frequency (RF) processing circuits, and said one or more circuits are operable to:
configure, during operation of said wireless terminal, a mode of operation of said wireless terminal based on which one of a plurality of wireless protocols are associated with RF signals to be received by said wireless terminal;
when operating in a first operating mode: enable said two RF processing circuits, receive said RF signals having a first wireless protocol format via a plurality of antennas simultaneously, and perform diversity processing for said received RF signals having a first wireless protocol format; and
when operating in a second operating mode: enable only one of said two RF processing circuits, receive said RF signals having a second wireless protocol format via said plurality of antennas by selecting an antenna and repeatedly switching between or among said plurality of antennas, cycle the selected antenna through a plurality of configurations, wherein each configurations is associated with a different center frequency within a specified range, and perform diversity processing for said received RF signals having said second wireless protocol format.

16. The system according to claim 15, wherein said first wireless protocol is at least one of the following: WCDMA protocol, HSDPA protocol, and HSUDPA protocol, and said wireless terminal operating in said first operating mode receives at least one of the following: WCDMA transmission, HSDPA transmission, and HSUDPA transmission.

17. The system according to claim 15, wherein said second wireless protocol is at least one of the following: GSM protocol, GPRS protocol, and EDGE protocol.

18. The system according to claim 15, wherein said wireless terminal receives time division multiplexed packets when operating in said second operating mode.

19. The system according to claim 15, wherein said one or more circuits are operable to switch from one of said plurality of antennas to another of said plurality of antennas after receiving a determined number of packets.

20. The system according to claim 15, wherein said diversity processing comprises processing a plurality of received packets to retrieve information for a single destination packet.

21. The system according to claim 15, wherein said one or more circuits are operable to switch between or among said plurality of antennas to transmit RF signals having said second wireless protocol format.

* * * * *